United States Patent
Gaffiero et al.

(10) Patent No.: US 10,836,482 B2
(45) Date of Patent: Nov. 17, 2020

(54) ROTORCRAFT HAVING A ROTARY WING AND AT LEAST TWO PROPELLERS, AND A METHOD APPLIED BY THE ROTORCRAFT

(71) Applicant: AIRBUS HELICOPTERS, Marignane (FR)

(72) Inventors: Jacques Gaffiero, Paris (FR); Christophe Serr, Simiane-Collongue (FR); Jean-Romain Bihel, Le Rove (FR)

(73) Assignee: AIRBUS HELICOPTERS, Marignane (FR)

( * ) Notice: Subject to any disclaimer, the term of this patent is extended or adjusted under 35 U.S.C. 154(b) by 41 days.

(21) Appl. No.: 16/394,195

(22) Filed: Apr. 25, 2019

(65) Prior Publication Data
US 2019/0329881 A1 Oct. 31, 2019

(30) Foreign Application Priority Data
Apr. 26, 2018 (FR) ...................................... 18 00372

(51) Int. Cl.
*B64C 29/00* (2006.01)
*B64C 27/08* (2006.01)
*B64C 27/52* (2006.01)

(52) U.S. Cl.
CPC .......... *B64C 29/0033* (2013.01); *B64C 27/08* (2013.01); *B64C 27/52* (2013.01)

(58) Field of Classification Search
CPC ......... B64C 27/06; B64C 27/08; B64C 27/22; B64C 27/26; B64C 27/28; B64C 27/52; B64C 29/0033; B64C 2027/8281; B64C 27/605; B64C 2027/8227
See application file for complete search history.

(56) References Cited

U.S. PATENT DOCUMENTS

| | | | | |
|---|---|---|---|---|
| 2,665,859 A | * | 1/1954 | Papadakos | B64C 27/26 244/7 R |
| 2,940,693 A | * | 6/1960 | Steedman | B64C 27/82 244/17.11 |

(Continued)

FOREIGN PATENT DOCUMENTS

| | | |
|---|---|---|
| CN | 105775121 A | 7/2016 |
| EP | 2690012 A1 | 1/2014 |

(Continued)

OTHER PUBLICATIONS

French Search Report for FR 1800372, Completed by the French Patent Office, dated Jan. 17, 2019, All together 8 Pages.

*Primary Examiner* — Medhat Badawi
(74) *Attorney, Agent, or Firm* — Brooks Kushman P.C.

(57) ABSTRACT

A rotorcraft comprising a fuselage, a single main rotor, and a first propeller and a second propeller. The rotorcraft has an adjustment system configured, at least during a stage of hovering flight, to position the first propeller in a first low speed configuration in order to exert a first thrust including a first horizontal component and a first vertical component, the adjustment system being configured, at least during the stage of hovering flight, to position the second propeller in a second low speed configuration so as to exert a second thrust comprising a second horizontal component and a second vertical component.

20 Claims, 6 Drawing Sheets

(56) References Cited

U.S. PATENT DOCUMENTS

| | | | | |
|---|---|---|---|---|
| 3,385,537 | A * | 5/1968 | Lichten | B64C 27/32 |
| | | | | 244/6 |
| 3,458,160 | A * | 7/1969 | Marchetti | B64C 29/0025 |
| | | | | 244/6 |
| 3,517,898 | A * | 6/1970 | Laville | F02K 3/025 |
| | | | | 244/7 R |
| 3,698,666 | A * | 10/1972 | Monti | B64C 27/26 |
| | | | | 244/7 A |
| 4,783,023 | A * | 11/1988 | Jupe | B64C 27/12 |
| | | | | 244/17.19 |
| 4,936,748 | A * | 6/1990 | Adamson | F02C 6/206 |
| | | | | 416/123 |
| 6,513,752 | B2 * | 2/2003 | Carter, Jr. | B64C 27/02 |
| | | | | 244/17.11 |
| 7,758,310 | B2 * | 7/2010 | Cotton | B64C 27/14 |
| | | | | 416/157 R |
| 7,823,827 | B2 | 11/2010 | Piasecki et al. | |
| 8,181,901 | B2 * | 5/2012 | Roesch | B64C 27/26 |
| | | | | 244/6 |
| 8,376,266 | B2 * | 2/2013 | Gemmati | B64C 27/22 |
| | | | | 244/17.19 |
| 8,583,295 | B2 * | 11/2013 | Eglin | B64C 27/26 |
| | | | | 701/4 |
| 8,602,348 | B2 * | 12/2013 | Bryant | B64C 39/024 |
| | | | | 244/12.4 |
| 8,616,492 | B2 * | 12/2013 | Oliver | B64D 27/06 |
| | | | | 244/12.4 |
| 8,826,597 | B2 * | 9/2014 | Raspic | B64C 1/32 |
| | | | | 49/475.1 |
| 8,840,057 | B2 * | 9/2014 | Moret | B64C 27/12 |
| | | | | 244/6 |
| 8,960,594 | B2 * | 2/2015 | Groen | B64C 27/18 |
| | | | | 244/17.11 |
| 8,967,524 | B2 * | 3/2015 | Leclercq | F15B 9/10 |
| | | | | 244/6 |
| 8,979,015 | B2 * | 3/2015 | Gaillard | B64C 27/82 |
| | | | | 244/17.19 |
| 9,045,223 | B2 * | 6/2015 | Connaulte | B64D 35/02 |
| 10,167,079 | B2 * | 1/2019 | Weiner | B64D 35/06 |
| 10,315,761 | B2 * | 6/2019 | McCullough | B64C 39/02 |
| 10,464,668 | B2 * | 11/2019 | Evulet | B64C 21/00 |
| 10,676,188 | B2 * | 6/2020 | Campbell | B64C 29/0033 |
| 2002/0011539 | A1 * | 1/2002 | Carter, Jr. | B64C 27/025 |
| | | | | 244/6 |
| 2003/0094537 | A1 * | 5/2003 | Austen-Brown | B64D 25/00 |
| | | | | 244/7 R |
| 2006/0192046 | A1 * | 8/2006 | Heath | B64D 35/04 |
| | | | | 244/12.3 |
| 2007/0170307 | A1 * | 7/2007 | de la Cierva Hoces | |
| | | | | B64C 27/24 |
| | | | | 244/7 R |
| 2007/0215750 | A1 * | 9/2007 | Shantz | A63H 30/04 |
| | | | | 244/17.23 |
| 2008/0169379 | A1 * | 7/2008 | Cotton | B64C 27/10 |
| | | | | 244/60 |
| 2008/0237392 | A1 * | 10/2008 | Piasecki | G05D 1/0858 |
| | | | | 244/6 |
| 2009/0014580 | A1 * | 1/2009 | Piasecki | B64C 27/28 |
| | | | | 244/17.19 |
| 2009/0159740 | A1 * | 6/2009 | Brody | B64C 27/10 |
| | | | | 244/17.21 |
| 2011/0001001 | A1 * | 1/2011 | Bryant | B64C 29/0033 |
| | | | | 244/12.5 |
| 2012/0091257 | A1 * | 4/2012 | Wolff | B64C 29/0033 |
| | | | | 244/12.4 |
| 2013/0134256 | A1 * | 5/2013 | Gaillard | B64C 27/82 |
| | | | | 244/17.21 |
| 2013/0182449 | A1 * | 7/2013 | Fidanza | B64D 47/04 |
| | | | | 362/470 |
| 2015/0314865 | A1 * | 11/2015 | Bermond | B64C 29/0033 |
| | | | | 244/17.27 |
| 2018/0057158 | A1 * | 3/2018 | Vialle | B64C 27/28 |
| 2019/0329881 | A1 * | 10/2019 | Gaffiero | B64C 27/28 |

FOREIGN PATENT DOCUMENTS

| | | |
|---|---|---|
| FR | 2916418 A1 | 11/2008 |
| FR | 2992696 A1 | 1/2014 |
| FR | 3024431 A1 | 2/2016 |
| FR | 3055311 A1 | 3/2018 |

* cited by examiner

ROTORCRAFT HAVING A ROTARY WING AND AT LEAST TWO PROPELLERS, AND A METHOD APPLIED BY THE ROTORCRAFT

CROSS-REFERENCE TO RELATED APPLICATIONS

This application claims priority to French patent application No. FR 1800372 filed on Apr. 26, 2018, the disclosure of which is incorporated in its entirety by reference herein.

BACKGROUND OF THE INVENTION

(1) Field of the Invention

The present invention relates to a rotorcraft having a rotary wing and at least two propellers, and to the method applied by the rotorcraft.

Rotorcraft are aircraft having a rotary wing.

A known rotorcraft has two propellers and a main rotor that contributes to providing the rotorcraft with at least part of its lift. The two propellers and the main rotor are caused to rotate continuously by a power plant.

Thus, a first propeller and a second propeller are arranged on either side of a fuselage of the rotorcraft. The first propeller and the second propeller are carried by respective half-wings extending on respective sides of the fuselage.

In addition, the first propeller and the second propeller are provided with blades that present collective pitch that is variable. The pitch of the blades of the first propeller can be varied in identical manner, i.e. simultaneously and in the same direction. The same applies to the second propeller.

Optionally, the pitch of the blades of at least one of the propellers may vary over a first pitch range generating thrust in a forward direction of the aircraft, and in a second pitch range generating thrust directed in a reverse direction that is opposite to the forward direction. The forward direction and the reverse direction of the rotorcraft are thus fixed, opposite, and coplanar. Such a propeller thus generates thrust tending solely to cause the aircraft to advance when the pitch of its blades lies in the first range, and thrust opposite to the forward direction when the pitch of its blades lies in the second range.

During stages of flight at a high speed of advance, the blades of the first propeller and of the second propeller are adjusted in pitch so that the first propeller and the second propeller generate respectively a first thrust and a second thrust in the forward direction. The main rotor and the half-wings carrying the propellers provide the rotorcraft with lift. The anti-torque function is provided at least in part by a tail fin mounted on a tail boom. The first thrust and the second thrust may thus present magnitudes that are different in order to control the yaw movement and position of the rotorcraft.

During stages of takeoff, landing, hovering flight, and more generally of flight at a low speed of advance, the first propeller may generate thrust in the same forward direction as it does during forward flight at high speed. In contrast, the second propeller may generate thrust that is directed in the reverse direction in order to contribute to controlling the yaw movement and position of the rotorcraft.

Consequently, such a rotorcraft has two propellers with respective horizontal axes of rotation, which axes are fixed. Only the pitch of the blades of each propeller can be varied collectively depending on the magnitude and the direction that are desired for the thrusts that they generate.

Such an aircraft can reach high speeds of advance. Nevertheless, the main rotor may then be subjected to large aerodynamic forces, which can require large control forces for controlling the main rotor and/or which may give rise to aerodynamic instabilities at the ends of the blades of the main rotor. In order to avoid those drawbacks, the diameter of the main rotor may be reduced and/or the twist per unit length of the blades of the main rotor may be reduced. Although they present certain advantages, those solutions tend to reduce the lift of the main rotor and thus the lift of the rotorcraft at low speed.

(2) Description of Related Art

Document FR 2 916 418 describes a rotorcraft having a main rotor and two propellers.

Document EP 2 690 012 describes a rotorcraft having a main rotor. That rotorcraft also has two propellers carried by a "canard" type wing. The propellers are vectored propellers that can be tilted about a tilt axis. Such a vectored propeller presents blades that rotate about an axis of rotation, which axis of rotation can itself be turned relative to the fuselage of the aircraft. More precisely, each axis of rotation can turn about a tilt axis.

Document U.S. Pat. No. 7,823,827 describes a rotorcraft. That rotorcraft has a fuselage carrying two main rotors. Furthermore, the rotorcraft has two ducted propellers that are arranged laterally on either side of the fuselage and longitudinally between the two main rotors. The two propellers may be vectored between a position in which they exert thrust contributing to advancing the aircraft, and a position in which they exert thrust contributing to providing the aircraft with lift. The propellers may be provided with flow-directing vanes.

Documents FR 3 055 311, FR 3 024 431, and CN 105775121 are also known.

BRIEF SUMMARY OF THE INVENTION

An object of the present invention is thus to propose a novel rotorcraft presenting optimized lift at low speed, the rotorcraft having a single main rotor and two propellers.

Such a rotorcraft comprises a fuselage, the fuselage extending longitudinally from rear to front from a tail to a nose, and transversely from a first flank to a second flank, the fuselage extending vertically upwards and being surmounted by a single main rotor contributing to providing the rotorcraft with at least part of its lift. A rectangular reference frame attached to the rotorcraft presents a first unit vector extending in a forward direction from the center of gravity of the rotorcraft towards the front, the rectangular reference frame presenting a second unit vector extending from the center of gravity in a direction going from the first flank to the second flank, and the rectangular reference frame presenting a third unit vector extending in an elevation direction from the center of gravity towards the main rotor. The rotorcraft comprises a first propeller and a second propeller carried respectively by two arms and exerting respectively a first thrust and a second thrust, said two arms not forming a canard wing, the first propeller and the second propeller being arranged transversely on either side of said fuselage, said first propeller and said second propeller respectively having first blades and second blades for rotating respectively about a first axis of rotation and a second axis of rotation. The first blades present pitch that can vary collectively in identical manner over a first pitch range generating a said first thrust directed towards the front of the rotorcraft and over a second pitch range generating a said first thrust directed towards the rear of the rotorcraft, said second blades presenting pitch that can vary collectively in identical manner, i.e. identically to one another, at least over a third pitch range generating a said second thrust directed solely towards the front of the rotorcraft.

The rotorcraft may thus have conventional first and second systems for modifying the collective pitch respectively of the first blades and of the second blades.

Each arm may be in the form of a lift surface, such as a half-wing.

Furthermore, the rotorcraft includes an adjustment system acting on the first propeller and on the second propeller, the adjustment system being configured, at least during a stage of hovering flight, to position the first propeller in a first low speed configuration, the first thrust in the first low speed configuration having a first horizontal component directed parallel to the first vector and in a direction opposite to the first vector, and a first vertical component directed parallel to the third vector in the elevation direction, said adjustment system being configured, at least during the stage of hovering flight, to position said second propeller in a second low speed configuration, the second thrust in the second low speed configuration comprising a second horizontal component directed parallel to the first vector and in the same direction as the first vector, and a second vertical component directed parallel to the third vector in the same direction as the third vector.

The first vector may be perpendicular to the second vector and the third vector. For example, the first vector may extend along a roll axis of the rotorcraft and/or the second vector may extend along a pitching axis of the rotorcraft and/or the third vector may extend along a yaw axis of the rotorcraft.

The rotorcraft then has a main rotor and two propellers, one on either side. Such a rotorcraft is thus capable of reaching high speeds of advance. The main rotor may nevertheless be dimensioned to avoid the above-listed annoyances.

In addition, the first propeller and the second propeller are configured firstly to generate respective thrusts enabling the rotorcraft to achieve high speeds of advance, and secondly also to provide extra lift, at least during hovering flight, so as to be able to use a main rotor of small size. Specifically, in hovering flight, the first thrust generated by the first propeller and the second thrust generated by the second propeller both present respective vertical components extending upwards in the reference frame of the rotorcraft.

The rotorcraft may also include one or more of the following characteristics.

Optionally, the first propeller and/or the second propeller may be ducted. For example, the first blades and the second blades may be surrounded by respective shrouds in their planes of rotation.

In an aspect, said adjustment system may be configured to position the first propeller in the first low speed configuration and the second propeller in the second low speed configuration when the rotorcraft is traveling forwards at a speed less than a speed threshold.

By way of illustration, the speed threshold may be equal to 50 knots, i.e. about 92.6 kilometers per hour. Under such circumstances, at less than 50 knots, the first propeller and the second propeller are respectively in the first low speed configuration and in the second low speed configuration.

In an aspect, in the first low speed configuration said first thrust may present an acute angle of less than 90 degrees relative to a horizontal plane containing the first vector and the second vector, the second thrust presenting an acute angle of less than 90 degrees with that horizontal plane.

In a first embodiment, the adjustment system may be configured to position the first propeller in a first high speed configuration and the second propeller in a second high speed configuration when the rotorcraft is flying forwards at a speed greater than or equal to a speed threshold, said first thrust in the first high speed configuration having a first horizontal component directed parallel to the first vector and in the same direction as the first vector, and a first vertical component directed parallel to the third vector in a direction opposite to the direction of the third vector, the second high speed configuration being identical to the second low speed configuration.

Thus, at low speed, the first propeller exerts first thrust that is directed upwards and towards the rear of the rotorcraft, with the second propeller exerting second thrust that is directed upwards and towards the front of the rotorcraft. At high speed, the first propeller exerts first thrust directed downwards and towards the front of the rotorcraft, while the second propeller exerts second thrust that is directed upwards and towards the front of the rotorcraft.

This configuration is surprising since the first thrust tends to be directed towards the ground, and not to provide the rotorcraft with lift. Nevertheless, the vertical component of the first thrust that is directed towards the ground may be compensated by the vertical component of the second thrust.

In this first embodiment, the direction of the first thrust may be reversed.

For example, in this first embodiment, when the rotorcraft is flying forwards at a speed greater than or equal to a speed threshold, and when seen in a transverse direction going from the first propeller towards the second propeller, said first thrust may present a first acute angle relative to a horizontal plane containing the first vector and the second vector, the second thrust presenting a second acute angle opposite to the first acute angle relative to the horizontal plane.

In this first embodiment, when seen in a transverse direction going from the first propeller towards the second propeller, said first axis of rotation may present a first acute angle with a horizontal plane containing the first vector and the second vector, the second axis of rotation presenting a second acute angle opposite to the first acute angle relative to the horizontal plane.

In this first embodiment, said first propeller may comprise a first propeller shaft for rotating a first hub carrying blades, said second propeller may comprise a second propeller shaft for rotating a second hub carrying blades, and said adjustment system may comprise a first device fastening the first propeller shaft to an arm while imparting to the first propeller shaft a single degree of freedom to move in rotation about the first axis of rotation relative to the fuselage, said adjustment system comprising a second device fastening the second propeller shaft to an arm while conferring to the second propeller shaft a single degree of freedom to move in rotation about the second axis of rotation relative to the fuselage.

The first propeller and the second propeller may both be on axes that are fixed relative to the rotorcraft and set at angles for presenting additional components that tend to optimize its lift. The first propeller is set downwards relative to the aircraft while the second propeller is set upwards.

Under such circumstances, the adjustment system may also include the conventional first and second systems for modifying the collective pitch respectively of the first blades and of the second blades.

In a second embodiment, the adjustment system may serve to tilt/incline the first thrust and the second thrust about a tilt axis.

In the second embodiment, the adjustment system may be configured to position the first propeller in a first high speed configuration and the second propeller in a second high speed configuration when the rotorcraft is flying forwards at a speed greater than or equal to a speed threshold, the first thrust in the first high speed configuration comprising solely a first horizontal component directed parallel to the first vector and in the same direction as the first vector, said second thrust in the second high speed configuration comprising solely a second horizontal component directed parallel to the first vector and in the same direction as the first vector.

In this second embodiment, the adjustment system serves to tilt the first thrust and the second thrust continuously about the tilt axis, optionally but not necessarily, from the above-mentioned low speed configuration to the above-mentioned high speed configuration.

In this second embodiment, when the rotorcraft is flying forwards at a speed greater than or equal to a speed threshold, said first thrust and said second thrust may be coplanar and parallel to a horizontal plane containing the first vector and the second vector.

Alternatively, it is possible to envisage other angles of inclination, in particular at a speed greater than or equal to the speed threshold. For example, the first thrust and the second thrust may be directed along the speed vector of the aircraft at high speed.

In a first variant of the second embodiment, said first propeller may comprise a first propeller shaft for rotating a first hub carrying blades, said second propeller may comprise a second propeller shaft for rotating a second hub carrying blades, and said adjustment system may comprise a first mobility system configured to move the first propeller shaft in rotation about a tilt axis imparting to the first propeller shaft relative to the fuselage solely one degree of freedom to move in rotation about the first axis of rotation and one degree of freedom to move in rotation about the tilt axis, said adjustment system including a second mobility system configured to move the second propeller shaft in rotation about the tilt axis imparting to the second propeller shaft relative to the fuselage solely one degree of freedom to move in rotation about the second axis of rotation, and one degree of freedom to move in rotation about the tilt axis.$$

The first propeller and the second propeller are thus steerable, e.g. over two respective angular sectors of less than 90 degrees. The adjustment system thus enables the first propeller and the second propeller to be tilted among various positions in order to steer the first thrust and the second thrust upwards at low speed in order to generate extra lift and in order to steer the first thrust and the second thrust along the forward direction or the speed vector of the aircraft at high speed, for example.

In this first variant of the second embodiment, the first propeller may be configured to tilt in a first tilt direction from a first position to be held in the first low speed configuration to a second position to be held in the first high speed configuration, the first axis of rotation and the first thrust coinciding and presenting a first acute angle of less than 90 degrees relative to a horizontal plane containing the first vector and the second vector in the first position, the first axis of rotation and the first thrust being parallel to the horizontal plane in the second position, for example.

The second propeller may be configured to tilt in a second tilt direction from a third position to be held in the second low speed configuration to a fourth position to be held in the second high speed configuration, the second axis of rotation and the second thrust coinciding and presenting a second acute angle of less than 90 degrees relative to the horizontal plane, the second tilt direction being opposite to the first tilt direction when seen in a transverse direction going from the first propeller to the second propeller, the second axis of rotation and the second thrust being parallel to the horizontal plane in the fourth position, for example.

In an aspect, the first propeller and the second propeller may be tilted through opposite angles. The second propeller generating thrust towards the front pivots upwards relative to the rotorcraft, while the first propeller generating rearward thrust pivots downwards relative to the rotorcraft.

By way of example, the tilt angles may be determined as a function of the powers developed by each of the propellers so that together the two propellers provide an anti-torque function while also presenting a vertical lift component.

In this first variant of the second embodiment, the main rotor may include main blades rotating about a main axis of rotation of the main rotor, said tilt axis intersecting said main axis of rotation.

In this first variant of the second embodiment, the first propeller may present a first thrust center positioned on the tilt axis and the second propeller presents a second center of thrust positioned on the tilt axis.

Each of the two above characteristics tend to limit the creation of harmful interfering forces while tilting the propellers.

Optionally, the first blades of the first propeller and the second blades of the second propeller are variable collectively only, or else they are variable both collectively and cyclically.

For example, and in a second variant of the second embodiment, the first propeller may comprise a first propeller shaft for rotating a first hub carrying blades, said second propeller may comprise a second propeller shaft for rotating a second hub carrying blades, and said adjustment system may include a first device for cyclically modifying the pitch of the blades of the first propeller and a second device for cyclically modifying the pitch of the blades of the second propeller.

The first device for modifying the pitch of the blades of the first propeller cyclically and the second device for modifying the pitch of the blades of the second propeller cyclically serve respectively to modify the pitch of the first blades and of the second blades as a function of their azimuth positions.

The first axis of rotation of the first propeller and the second axis of rotation of the second propeller may always lie in the same plane.

The first axis of rotation of the first propeller and the second axis of rotation of the second propeller are fixed relative to the rotorcraft and horizontal in its frame of reference. However, by way of example, the first propeller and the second propeller may be fitted with respective sets of swashplates of the type that is known for a main rotor of a helicopter. Adjusting the positions and the angles of the swashplates in the cyclic sets of swashplates serves to steer the first thrust and the second thrust.

In addition to an aircraft, the invention also provides a method of optimizing the lift of such a rotorcraft.

The method includes the following step:

positioning the first propeller in the first low speed configuration and the second propeller in the second low speed configuration during a stage of hovering flight.

Optionally, the method includes the following step:

positioning the first propeller in the first high speed configuration and the second propeller in the second speed configuration when the rotorcraft is traveling forwards at a speed greater than or equal to a speed threshold.

BRIEF DESCRIPTION OF THE DRAWINGS

The invention and its advantages appear in greater detail from the following description of examples given by way of illustration and with reference to the accompanying figures, in which.

DETAILED DESCRIPTION OF THE INVENTION

Elements present in more than one of the figures are given the same references in each of them.

FIGS. 1 to 11 show various embodiments of a rotorcraft of the invention.

Figure 1:
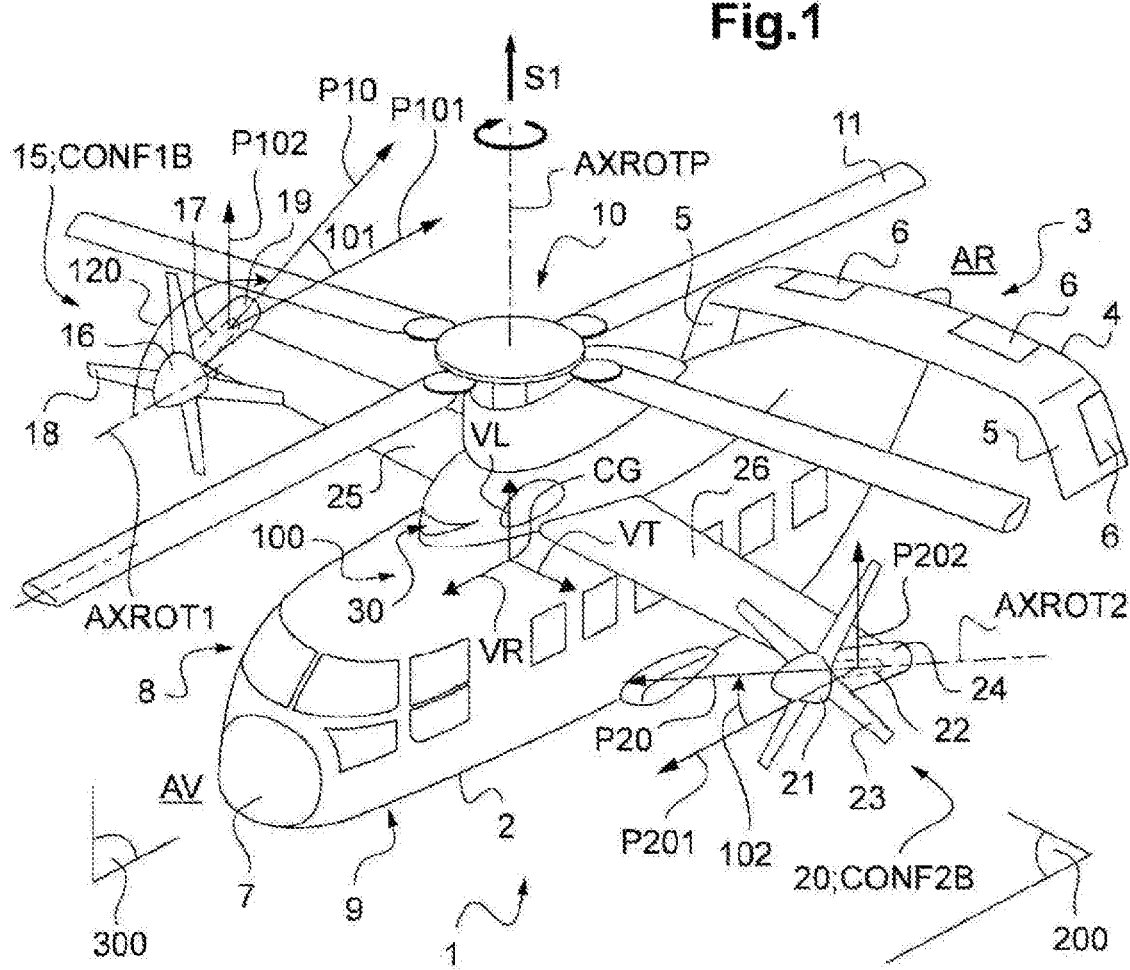
FIGS. 1 to 3 are views showing an aircraft having an adjustment system imparting a fixed setting to the propellers.

In all of the embodiments, and with reference to FIG. 1, such a rotorcraft 1 has a fuselage 2. The fuselage 2 extends longitudinally along a roll axis from rear AR to front AV, from a tail 3 towards a nose 7. Conventionally, a cockpit and/or a cabin may be arranged at the nose. In addition, the aircraft may include at least one tailplane 4 and at least one fin 5 at its tail 3. In the example shown, the rotorcraft 1 has an upside-down U-shaped structure comprising one tailplane 4 and two fins 5 that are arranged transversely on either side of the tailplane. The tailplane 4 and/or at least one fin 5 may include control surfaces 6.

In addition, the fuselage 2 extends transversely along a pitching axis of the rotorcraft from a first flank 8 towards a second flank 9. The fuselage 2 also extends vertically upwards along a pitching axis.

The rotorcraft 1 also has a single main rotor 10 that contributes to providing the rotorcraft 1 with lift and possibly also with propulsion. The main rotor 10 has main blades 11 situated above the fuselage 2. These main blades 11 rotate together about an axis of rotation AXROTP. The rotorcraft may include conventional controls for controlling a system for modifying the pitch of the main blades, for example, a set of swashplates giving a human pilot and/or an autopilot the possibility of modifying the pitch of the main blades 11 collectivity and/or cyclically.

The rotor 10 may be driven in rotation by a power plant 30, e.g. continuously other than in the event of engine failure or during testing. Such a power plant may comprise one or more engines, at least one main gearbox (MGB), . . . .

In another aspect, the rotorcraft has at least two propellers, and for example at least one first propeller 15 and at least one second propeller 20. The first and second propellers 15 and 20 are arranged transversely on either side of the fuselage 2, and by way of example the first propeller may be situated beside the first flank 8 and the second propeller beside the second flank 9.

The first propeller 15 and the second propeller 20 may be carried by two respective arms 25 and 26 that are secured to the fuselage 2. Such arms 25 and 26 may be lift-producing members. In the example shown in FIG. 1, the two arms represent the two half-wings of a high wing, these half-wings being of substantially rectangular plane shape and presenting a negative dihedral. In an aspect, the arms do not form a canard wing, so distinct from a canard wing.

In conventional manner, the first propeller 15 may have a first propeller shaft 17 for rotating a first hub 16 carrying first blades 18. The first shaft 17 rotates together with the first hub and the first blades about the first axis of rotation.

Likewise, the second propeller 20 may comprise a second propeller shaft 22 serving to rotate a second hub 21 carrying second blades 23. The second shaft 22 rotates together with the second hub and the second blades about the second axis of rotation.

The first propeller shaft 17 and the second propeller shaft 22 are mechanically connected to the power plant 30 by conventional drive trains. The first propeller shaft 17 and the second propeller shaft 22 are driven in rotation by the power plant 30 in flight, at least other than in the event of a failure or a test.

The rotorcraft may include conventional controls controlling a set of swashplates and/or a piston to enable a human pilot and/or an autopilot to modify collectively at least the pitch of the first blades 18 and of the second blades 23. By way of example, a lever may control two servo-controls for this purpose. In particular, it is possible to use collective control devices of the type disclosed in Document FR 2 992 696.

Under such circumstances, the pitch of the first blades 18 may vary collectively in identical manner in order to modify the magnitude and the direction of the first thrust exerted by the first propeller 15. Specifically, the pitch of the first blades 18 may vary collectively over a first pitch range generating a first thrust P1 directed towards the front of the rotorcraft 1, and over a second pitch range generating a first thrust directed towards the rear of the rotorcraft.

The terms "front" and "rear" mean that if the pitch of the first blades 18 is in the first range, the first propeller exerts a first thrust tending to cause the rotorcraft to advance. In contrast, and conversely, if the pitch of the first blades 18 is in the second range, the first propeller exerts first thrust tending to move the rotorcraft in reverse.

Furthermore, the second blades 23 present pitch that can be varied collectively in identical manner at least over a third pitch range generating second thrust P2 directed solely towards the front of the rotorcraft. Optionally, but not necessarily, the second blades 23 present pitch that may be varied collectively over a fourth pitch range generating second thrust P2 directed towards the rear of the rotorcraft.

Furthermore, the rotorcraft 1 is associated with a rectangular reference frame 100. This rectangular reference frame 100 possesses a first unit vector VR extending in the forward direction towards the front of the rotorcraft, from the center of gravity CG of the rotorcraft 1 substantially towards the nose 7, e.g. along the roll axis of the rotorcraft. This rectangular reference frame 100 also possesses a second unit vector VT extending from the center of gravity CG going from the first flank 8 towards the second flank 9, e.g. along the pitching axis of the rotorcraft. Finally, the rectangular reference frame 100 possesses a third unit vector VL extending in the upward direction S1 from the center of gravity CG towards the main rotor 10, e.g. along the yaw axis of the rotorcraft. The first vector VR and the second vector VT define a horizontal plane 200. The first vector VR and the third vector VL define a vertical plane 300.

Furthermore, the rotorcraft 1 includes an adjustment system 50 acting on the first propeller 15 and on the second propeller 20 in order to adjust the first thrust and the second thrust.

Figure 5:
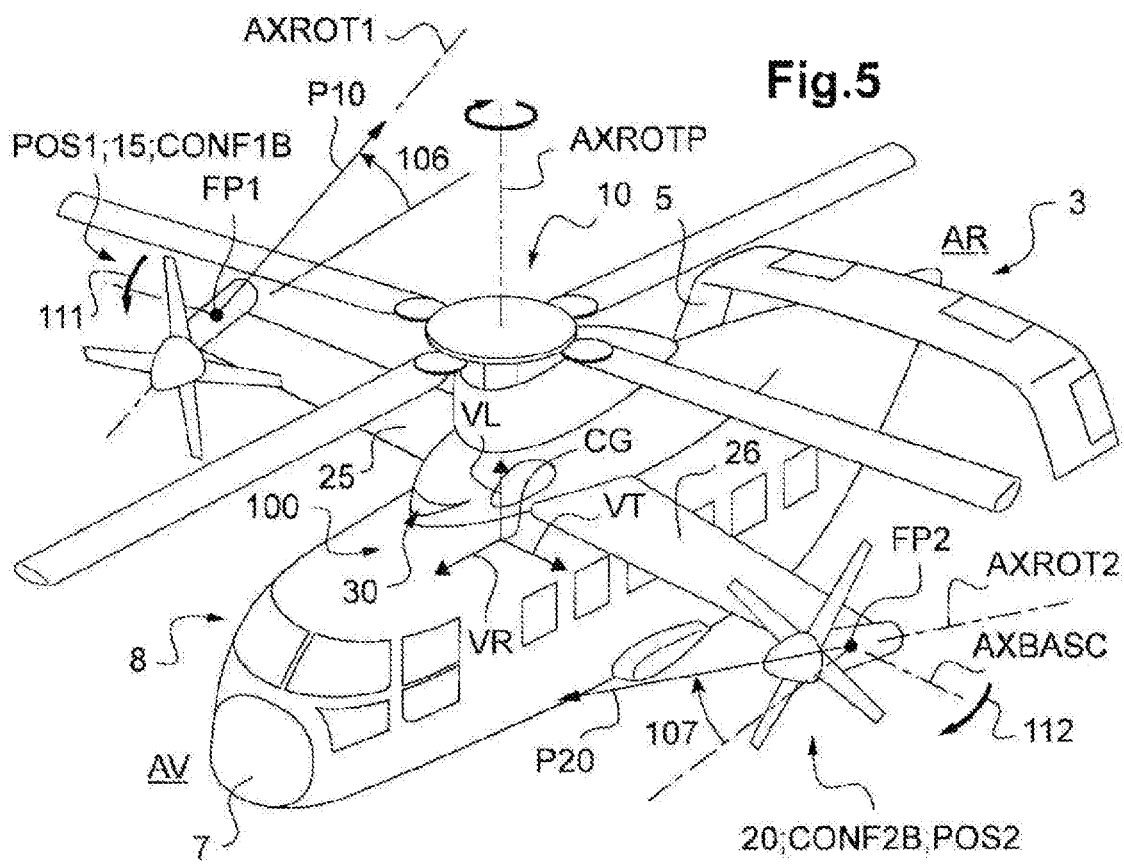
Figure 11:
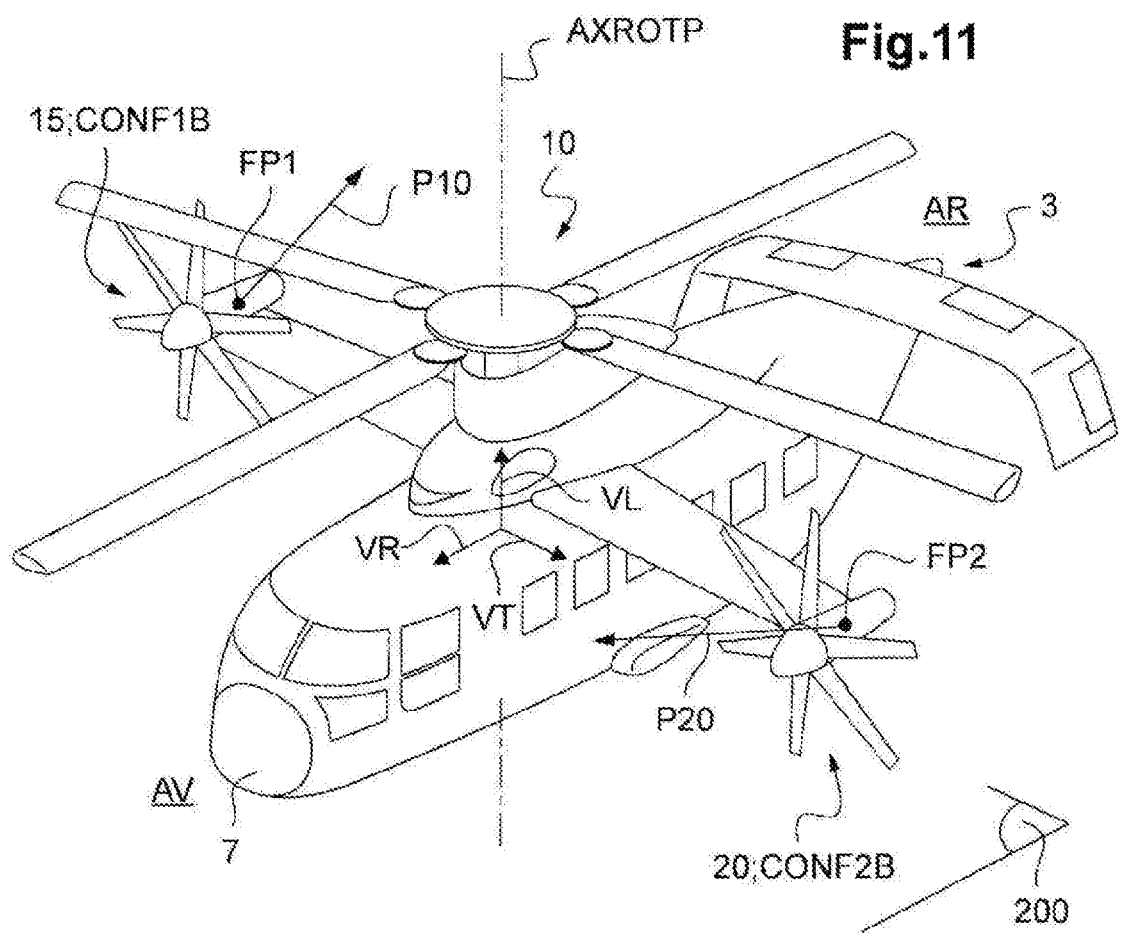

During a stage of hovering flight and/or during a stage of forward flight taking place below a speed threshold, e.g. a speed threshold equal to 50 knots, the adjustment system 50 places the first propeller 15 in a first low speed configuration conf1b and the second propeller 20 in a second low speed configuration conf2b, as shown in FIGS. 1, 5, and 11, depending on the variant.

The adjustment system includes at least the first system for modifying the collective pitch of the first blades.

Whatever the variant, and with reference to FIG. 1, in the first low speed configuration conf1b, the first thrust P10 presents an acute angle 101 of less than 90 degrees relative to the horizontal plane 200, the second thrust P20 likewise presenting an acute angle 102 of less than 90 degrees relative to the horizontal plane 200.

The first thrust P10 and the second thrust P20 are also optionally parallel to the vertical plane 300.

In an aspect, and considering an angle to be positive going from the first vector VR towards the third vector VL, a projection of the first thrust P10 onto the vertical plane presents an obtuse angle 120 that is positive relative to the first vector VR, and a projection of the second thrust P20 onto the vertical plane presents an acute angle 102 that is positive relative to the first vector VR.

The first thrust P10 can thus be resolved into a first horizontal component P101 and a first vertical component P102. The first horizontal component P101 is directed parallel to the first vector VR in a direction opposite to the direction of the first vector VR, and thus towards the rear AR of the rotorcraft. The first vertical component P102 is directed parallel to the third vector VL and in the elevation direction S1, i.e. upwards in the reference frame of the rotorcraft.

In the second low speed configuration conf2b, the second thrust P20 also has a second horizontal component P201 and a second vertical component P202. The second horizontal component P201 is parallel to the first vector VR and extends in the same direction as the first vector VR. The second vertical component P202 is parallel to the third vector VL and is in the same direction as the third vector VL.

Under such circumstances, the first horizontal component and the second horizontal component tend to generate torque enabling the yaw movement of the rotorcraft to be controlled, and in particular serving to oppose the torque exerted on the fuselage by the main rotor.

The first vertical component and the second vertical component act together tending to provide the rotorcraft with lift.

Figure 2:
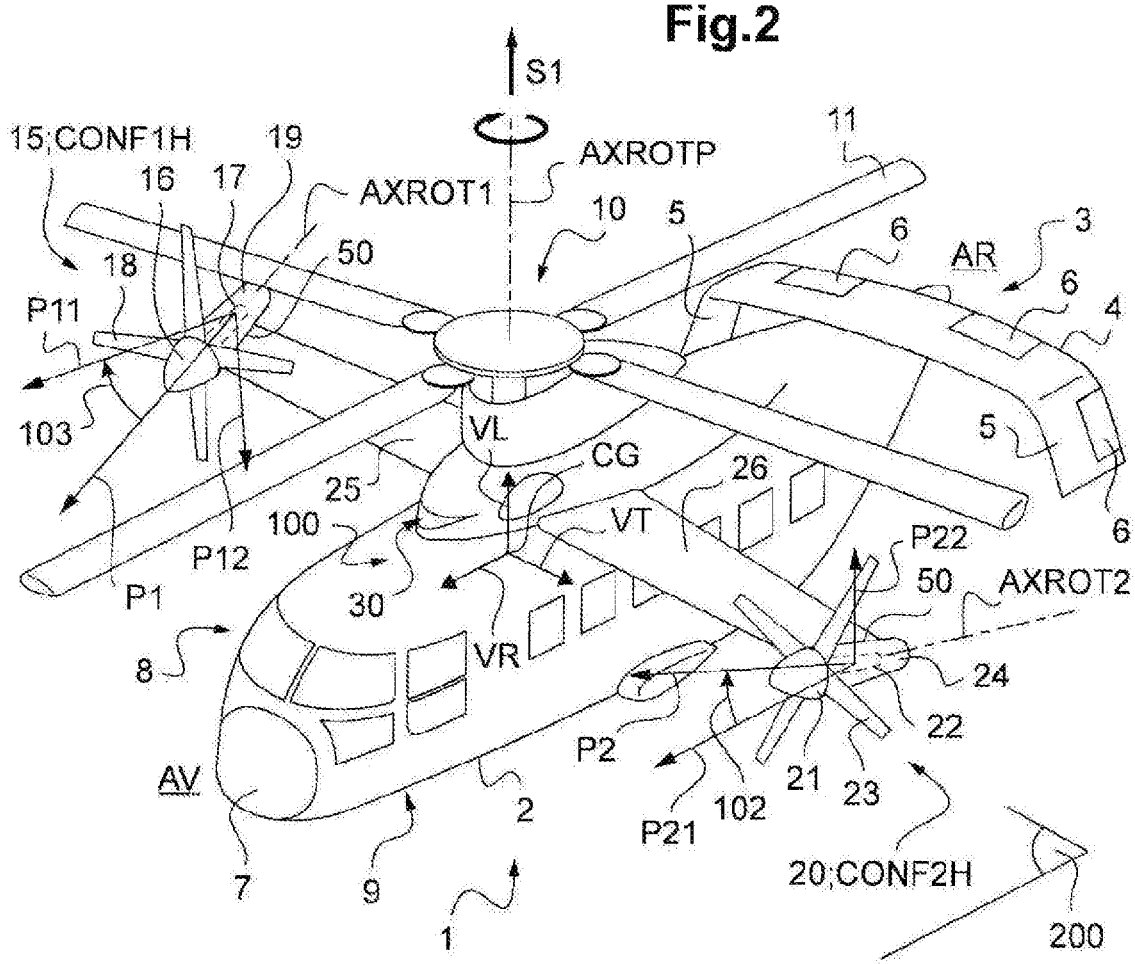
Figure 4:
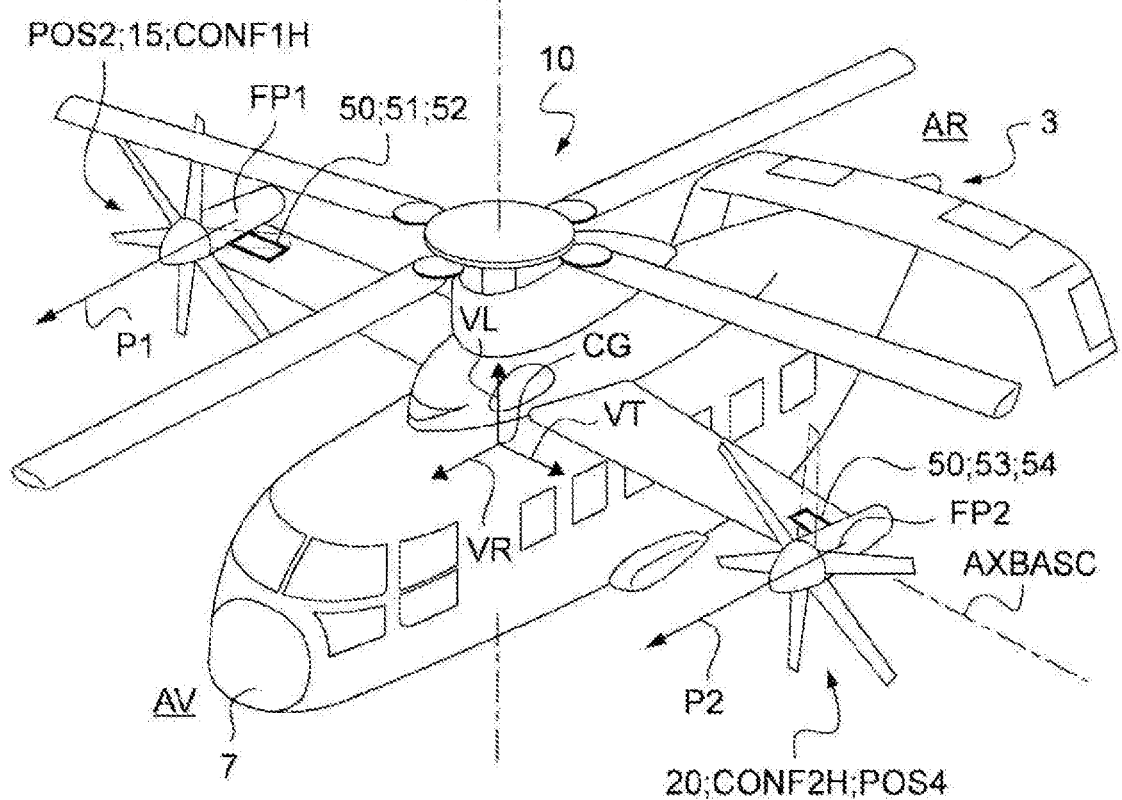
FIGS. 4 to 8 are views showing an aircraft having an adjustment system with systems for tilting the propellers in two opposite directions, seen in side view.
Figure 10:
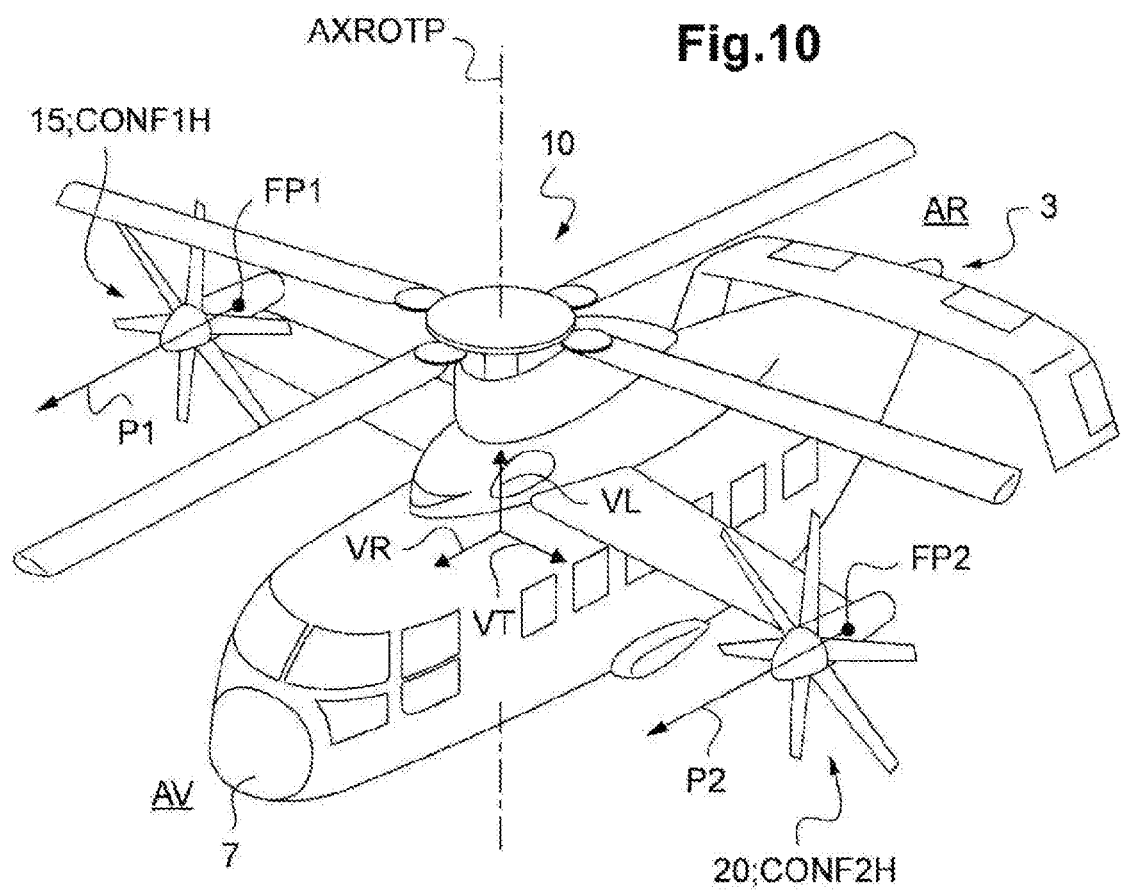

If the speed of the aircraft is greater than or equal to the speed threshold, the adjustment system 50 places the first propeller 15 in a first high speed configuration conf1h and places the second propeller 20 in a second high speed configuration conf2h, as shown in particular in FIGS. 2, 4, and 10, depending on the variant, in order to cause the rotorcraft to advance.

Figure 3:
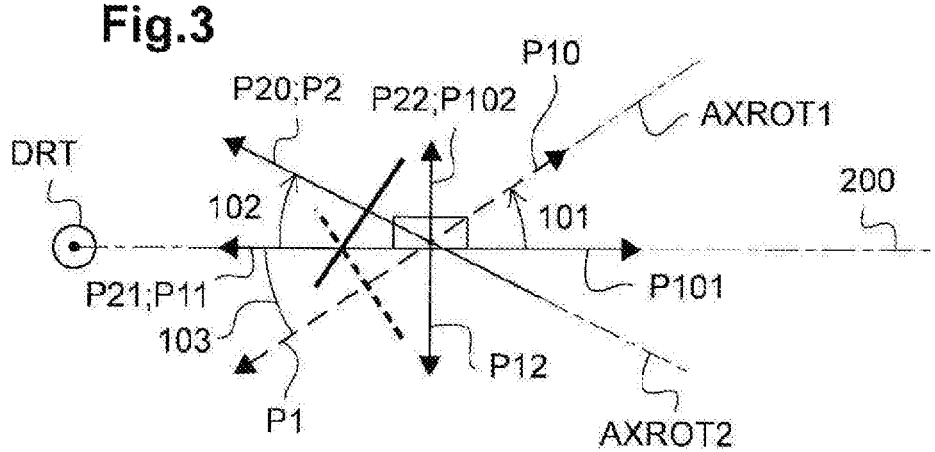

In the first rotorcraft shown in FIGS. 1 to 3, and with reference to FIG. 2, in the first high speed configuration conf1h, the first thrust P1 presents a first horizontal component P11 directed parallel to the first vector VR and in the same direction as the first vector VR, and a first vertical component P12 directed parallel to the third vector in a direction that is opposite to the direction of the third vector VL.

In addition, the second high speed configuration conf2h is also identical to the second low speed configuration conf2b.

The first thrust P1 and the second thrust P2 may also optionally be parallel to the vertical plane 300.

In an aspect, and considering an angle to be positive going from the first vector VR towards the third vector VL, a projection of the first thrust P1 onto the vertical plane presents an acute angle 103 that is negative relative to the first vector VR, and a projection of the second thrust P2 onto the vertical plane presents an acute angle 102 that is positive relative to the first vector VR.

Under such circumstances, the first horizontal component and the second horizontal component may tend to generate torque serving to control the yaw movement of the rotorcraft, and they tend to cause the aircraft to advance towards the front.

The first vertical component and the second vertical component tend to cancel, with the rotorcraft being provided with lift by the main rotor and by its various lift surfaces.

Optionally, the first propeller 15 and the second propeller 20 have fixed settings, the first axis of rotation AXROT1 and the second axis of rotation AXROT2 being fixed relative to the fuselage 2.

For this purpose, the adjustment system 50 may include a first device 19 attaching the first propeller shaft 17 to an arm 25 providing the first propeller shaft 17 solely with one degree of freedom to move in rotation about the first axis of rotation AXROT1 relative to the fuselage 2. Likewise, the adjustment system 50 includes a second device 24 attaching the second propeller shaft 22 to an arm 26 while giving the second propeller shaft 22 a single degree of freedom to move in rotation about the second axis of rotation AXROT2 relative to the fuselage 2.

For example, the first device comprises a first propeller nacelle 19 fastened to a first arm 25 by conventional means such as welding, riveting, adhesive bonding, screw fastening, . . . . The first propeller shaft 17 is then carried by the first nacelle while being free to move in rotation relative to the first nacelle. For example, bearing means are interposed between the first nacelle and the first shaft 17. Likewise, the second device may comprise a second propeller nacelle 24 fastened to a second arm 26. The second propeller shaft 22 is then carried by the second nacelle and is movable in rotation relative to the second nacelle. For example, bearing means may be interposed between the second nacelle and the second shaft 22.

In other words, the first propeller and the second propeller each present a fixed setting relative to the fuselage.

In order to position the rotorcraft in a low speed configuration as shown in FIG. 1, the pitch of the first blades is then adjusted by the first system for modifying the collective pitch of the first blades so as to lie in the second pitch range. In order to position the rotorcraft in the high speed configuration shown in FIG. 2, the pitch of the first blades is adjusted by the first system for modifying the collective pitch of the first blades so as to lie in the first pitch range.

Furthermore, and with reference to FIG. 3, when the rotorcraft 1 is traveling forwards at a speed greater than or equal to a threshold speed, when seen in a transverse direction drt going from the first propeller 15 towards the second propeller 20, the first thrust P1 may present a first acute angle 103 relative to the horizontal plane 200. In addition, the second thrust P2 may present a second acute angle 102 that is opposite to the first acute angle 103 relative to the horizontal plane 200.

Considering an angle to be positive in a direction going from the first vector VR to the third vector VL, a projection of the first thrust P1 onto the vertical plane presents a first angle 103 that is negative relative to the first vector VR, and a projection of the second thrust P2 onto the vertical plane presents a second acute angle 102 that is positive relative to the first vector VR.

Likewise, looking along the transverse direction drt, the first axis of rotation AXROT1 may present a first acute angle 103 relative to the horizontal plane 200, the second axis of rotation AXROT2 presenting the second acute angle 102 relative to the horizontal plane 200 that is opposite to the first acute angle 103.

In the first embodiment, the first thrust may always be exerted along the first axis of rotation, and the second thrust may always be exerted along the second axis of rotation.

In the second embodiment, the first thrust and the second thrust can be tilted, at least about a tilt axis.

In the second embodiment, as shown in FIGS. 4 to 11, and with reference to FIG. 4, in the first high speed configuration conf1*h* the first thrust P1 may comprise solely a first horizontal component directed parallel to the first vector VR and in the same direction as the first vector VR.

Likewise, in the second high speed configuration conf2*h*, the second thrust P2 may comprise solely a second horizontal component directed parallel to the first vector VR and in the same direction as the first vector VR.

Optionally, when the rotorcraft 1 is moving forwards at a speed greater than or equal to the threshold speed, the first thrust P1 and the second thrust P2 are coplanar and parallel to the horizontal plane 200.

Alternatively, at high speed, the first thrust and the second thrust may present other angles of inclination, for example they may be steered towards the speed vector of the aircraft.

Independently of these aspects, in a first variant of the second embodiment shown in FIG. 4, the adjustment system 50 may include a first mobility system 51. This first mobility system 51 can move the first propeller shaft 17 into rotation about the tilt axis AXBASC imparting to the first propeller shaft 17 relative to the fuselage 2 a single degree of freedom in rotation about the first axis of rotation AXROT1 and one degree of freedom in rotation about the tilt axis AXBASC.

Likewise, the adjustment system 50 includes a second mobility system 53. The second mobility system 53 can cause the second propeller shaft to move in rotation about the tilt axis AXBASC by giving the second propeller shaft 22 relative to the fuselage 2 a single degree of freedom to move in rotation about the second axis of rotation AXROT2, and one degree of freedom to move in rotation about the tilt axis AXBASC.

For example, the first mobility system 51 may be of known type and may comprise a motor 52 for turning a first nacelle of the first propeller. Likewise, the second mobility system 53 may be of known type and may comprise a motor 54 for turning a second nacelle of the second propeller. The motors 52 and 54 may be carried by the arms 25 and 26. It is possible in particular to use the teaching of Document FR 3 055 311.

The tilt axis AXBASC may intersect the main axis of rotation AXROTP of the main rotor in order to facilitate tilting the first propeller and tilting the second propeller.

In another aspect, the first propeller 15 may present a first thrust center FP1 positioned on the tilt axis AXBASC. Likewise, the second propeller 20 may present a second thrust center FP2 positioned on the tilt axis AXBASC.

In the first high speed configuration conf1*h*, the first propeller may be in a position referred to as the "second position POS2" presenting a first axis of rotation parallel to the first vector VR in the example of FIG. 4.

Likewise, in the second high speed configuration conf2*h*, the second propeller may be in a position referred to as the "fourth position POS4" by presenting a second axis of rotation parallel to the first vector VR in the example of FIG. 4. The pitch of the first blades is then adjusted by the first system for modifying the collective pitch of the first blades so as to lie in the second pitch range. Likewise, the pitch of the second blades is adjusted by the second system for modifying the pitch of the second blades so as to lie in the third pitch range.

The first axis of rotation AXROT1, the first thrust P1, the second axis of rotation AXROT2, and the second thrust P2 are then parallel to the horizontal plane 200.

Alternatively, above the speed threshold, the first thrust and the second thrust may for example be steered to be parallel to the speed vector of the aircraft in order to reduce the dynamic forces exerted on the propellers.

With reference to FIG. 5, when the speed of the rotorcraft becomes equal to or less than the speed threshold, the first mobility system 51 tilts the first propeller in a first tilting direction 111 from the second position POS2 towards a first position POS1 that is to be retained in the first low speed configuration conf1*b*. The first axis of rotation AXROT1 and the first thrust P10 then coincide and present a first acute angle 106 of less than 90 degrees that is negative relative to the horizontal plane 200.

The second mobility system 53 tilts the second propeller in a second tilting direction 112 from the fourth position POS4 to a third position POS3 to be retained in the second low speed configuration conf2*b*. The second axis of rotation AXROT2 and the second thrust P20 coincide and present a second acute angle 107 of less than 90 degrees that is positive relative to the horizontal plane 200.

The second tilt direction 112 is opposite to the first tilt direction 111 when seen along a transverse direction drt going from the first propeller 15 towards the second propeller 20.

The pitch of the first blades is then adjusted by the collective control device to lie in the second pitch range. Likewise, the pitch of the second blades is adjusted by the collective control device to lie in the third pitch range.

The first thrust P10 and the second thrust P20 may also optionally be parallel to the vertical plane 300.

In an aspect, and considering an angle to be positive going from the first vector VR to the third vector VL, a projection of the first thrust P10 onto the vertical plane presents an acute angle that is positive relative to the first vector VR, and a projection of the second thrust P20 onto the vertical plane presents an acute angle that is positive relative to the first vector VR.

Figure 6:
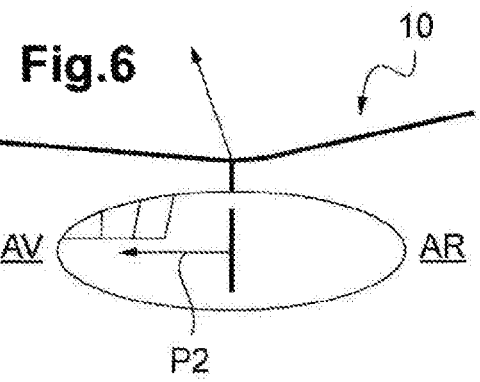
Figure 7:
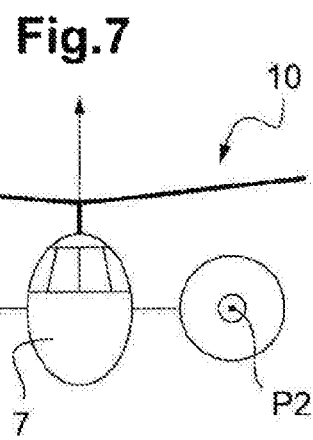

FIGS. 6 and 7 show the thrusts exerted at high speed together with their horizontal and vertical components.

Figure 8:
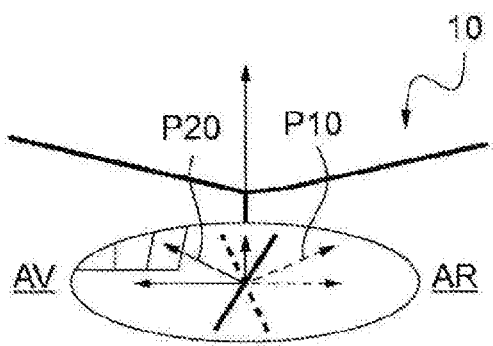

FIG. 8 shows the thrust exerted at low speed.

Figure 9:
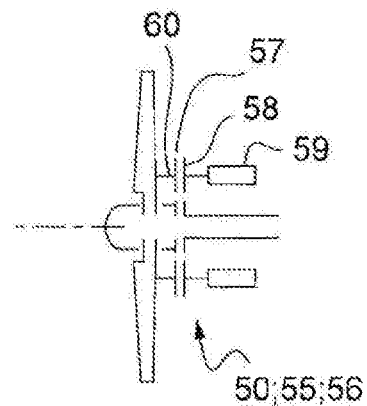
FIGS. 9 to 11 are views showing an aircraft having an adjustment system with systems for modifying the cyclic pitch of the blades of the propellers.

In a second variant of the second embodiment, as shown in FIG. 9, the adjustment system 50 comprises a first device 55 for cyclic modification of the pitch of the blades of the first propeller 15, and a second device 56 for cyclic modification of the pitch of the blades of the second propeller 20.

Each device for cyclic pitch modification comprises by way of example a non-rotary swashplate 58 that does not turn about an axis of rotation of the corresponding propeller, and a rotary swashplate 57 that rotates about said axis of rotation. The rotary swashplate 57 is connected to each blade of the corresponding propeller by a pitch rod 60. Optionally, the non-rotary swashplate 58 is connected directly to controls that can be moved by a human pilot or by an autopilot, or is connected indirectly via servo-controls 59. The non-rotary swashplate 58 and the rotary swashplate 57 are movable together in translation along the axis of rotation and in rotation about a center of rotation that is movable in translation along the axis of rotation.

By way of example, such a device for cyclic pitch modification may be of the same type as the sets of swashplates for rotors and they may also enable the pitch of the blades to be adjusted collectively.

In FIG. 10, beyond the speed threshold, the first device 55 for cyclic pitch modification and the second device 56 for cyclic pitch modification may for example both be operated so as to obtain zero cyclic pitch so that the first thrust and the second thrust are both parallel to the first vector.

In FIG. 11, below the speed threshold, the first device 55 for cyclic pitch modification and the second device 56 for cyclic pitch modification may for example be operated so as to cause the first thrust and the second thrust to be inclined relative to the horizontal plane 200.

In addition to these flight configurations described by FIGS. 10 and 11, the first device 55 for cyclic pitch modification and the second device 56 for cyclic pitch modification may be used at any time to steer individually the first thrust from the first propeller 15 and the second thrust from the second propeller 20 both in the horizontal plane 200 and in the vertical plane 300 in order to contribute to controlling the aircraft.

Above the speed threshold, the first device 55 for cyclic pitch modification and the second device 56 for cyclic pitch modification may steer the first thrust and the second thrust so as to align them parallel to the speed vector of the aircraft in order to reduce the dynamic forces exerted on the propellers. The first thrust and the second thrust then need not necessarily be aligned along the first and second axes of rotation of the first propeller and of the second propeller.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotorcraft comprising a fuselage, the fuselage extending longitudinally from rear to front from a tail to a nose, and transversely from a first flank to a second flank, the fuselage extending vertically upwards and surmounted by a single main rotor contributing to providing the rotorcraft with at least part of the lift of the rotorcraft, the rotorcraft having a rectangular reference frame presenting a first unit vector extending in a forward direction from a center of gravity of the rotorcraft towards the front, the rectangular reference frame presenting a second unit vector extending from the center of gravity in a direction going from the first flank to the second flank, and the rectangular reference frame presenting a third unit vector extending in an elevation direction from the center of gravity towards the main rotor, the rotorcraft comprising a first propeller and a second propeller carried respectively by two arms and capable of exerting respectively first thrust and second thrust, the two arms not forming a canard wing, the first propeller and the second propeller arranged transversely on either side of the fuselage, the first propeller and the second propeller respectively having first blades and second blades for rotating respectively about a first axis of rotation and a second axis of rotation, the first blades presenting pitch capable of varying collectively uniformly over a first pitch range generating the first thrust directed towards the front of the rotorcraft and over a second pitch range generating the first thrust directed towards the rear of the rotorcraft, wherein the rotorcraft includes an adjustment system acting on the first propeller and the second propeller, the second blades presenting pitch capable of varying collectively uniformly at least over a third pitch range generating the second thrust directed solely towards the front of the rotorcraft, the adjustment system configured, at least during a stage of hovering flight, to position the first propeller in a first low speed configuration, the first thrust in the first low speed configuration having a first horizontal component directed parallel to the first vector and in a direction opposite to the first vector, and a first vertical component directed parallel to the third vector in the elevation direction, the adjustment system configured, at least during the stage of hovering flight, to position the second propeller in a second low speed configuration, the second thrust in the second low speed configuration comprising a second horizontal component directed parallel to the first vector and in the same direction as the first vector, and a second vertical component directed parallel to the third vector in the same direction as the third vector.

2. The rotorcraft according to claim 1, wherein the adjustment system is configured to position the first propeller in the first low speed configuration and the second propeller in the second low speed configuration when the rotorcraft is traveling forwards at a speed less than a speed threshold.

3. The rotorcraft according to claim 1, wherein in the first low speed configuration the first thrust presents an acute angle of less than 90 degrees relative to a horizontal plane containing the first vector and the second vector, the second thrust presenting an acute angle of less than 90 degrees with that horizontal plane.

4. The rotorcraft according to claim 1, wherein the adjustment system is configured to position the first propeller in a first high speed configuration and the second propeller in a second high speed configuration when the rotorcraft is flying forwards at a speed greater than or equal to a speed threshold, the first thrust in the first high speed configuration having a first horizontal component directed parallel to the first vector and in the same direction as the first vector, and a first vertical component directed parallel to the third vector in a direction opposite to the direction of the third vector, the second high speed configuration is identical to the second low speed configuration.

5. The rotorcraft according to claim 1, wherein when the rotorcraft is flying forwards at a speed greater than or equal to a speed threshold, and when seen in a transverse direction going from the first propeller towards the second propeller, the first thrust presents a first acute angle relative to a horizontal plane containing the first vector and the second vector, the second thrust presenting a second acute angle opposite to the first acute angle relative to the horizontal plane.

6. The rotorcraft according to claim 1, wherein, when seen in a transverse direction going from the first propeller towards the second propeller, the first axis of rotation presents a first acute angle with a horizontal plane containing the first vector and the second vector, the second axis of rotation presenting a second acute angle opposite to the first acute angle relative to the horizontal plane.

7. The rotorcraft according to claim 1, wherein the first propeller and the second propeller present fixed settings, the first axis of rotation and the second axis of rotation are fixed relative to the fuselage.

8. The rotorcraft according to claim 7, wherein the first propeller comprises a first propeller shaft for rotating a first hub carrying first blades, the second propeller comprises a second propeller shaft for rotating a second hub carrying second blades, and the adjustment system comprises a first device fastening the first propeller shaft to one of the arm while imparting to the first propeller shaft a single degree of freedom to move in rotation about the first axis of rotation relative to the fuselage, the adjustment system comprising a second device fastening the second propeller shaft to the other arm while conferring to the second propeller shaft a single degree of freedom to move in rotation about the second axis of rotation relative to the fuselage.

9. The rotorcraft according to claim 1, wherein the adjustment system is configured to position the first propeller in a first high speed configuration and the second propeller in a second high speed configuration when the rotorcraft is flying forwards at a speed greater than or equal to a speed threshold, the first thrust in the first high speed configuration comprising solely a first horizontal component directed parallel to the first vector and in the same direction as the first vector, the second thrust in the second high speed configuration comprising solely a second horizontal component directed parallel to the first vector and in the same direction as the first vector.

10. The rotorcraft according to claim 1, wherein when the rotorcraft is flying forwards at a speed greater than or equal to a speed threshold, the first thrust and the second thrust are coplanar, the first thrust and the second thrust are parallel to a horizontal plane containing the first vector and the second vector.

11. The rotorcraft according to claim 1, wherein the first propeller comprises a first propeller shaft for rotating a first hub carrying blades, the second propeller comprises a second propeller shaft for rotating a second hub carrying blades, and the adjustment system comprises a first mobility system configured to move the first propeller shaft in rotation about a tilt axis imparting to the first propeller shaft relative to the fuselage solely one degree of freedom to move in rotation about the first axis of rotation and one degree of freedom to move in rotation about the tilt axis, the adjustment system including a second mobility system configured to move the second propeller shaft in rotation about the tilt axis imparting to the second propeller shaft relative to the fuselage solely one degree of freedom to move in rotation about the second axis of rotation, and one degree of freedom to move in rotation about the tilt axis.

12. The rotorcraft according to claim 11, wherein the first propeller is configured to tilt in a first tilt direction from a first position held in the first low speed configuration to a second position held in the first high speed configuration, the first axis of rotation and the first thrust coinciding and presenting a first acute angle of less than 90 degrees relative to a horizontal plane containing the first vector and the second vector in the first position, the first axis of rotation and the first thrust are parallel to the horizontal plane in the second position; and
  wherein the second propeller is configured to tilt in a second tilt direction from a third position held in the second low speed configuration to a fourth position held in the second high speed configuration, the second axis of rotation and the second thrust coinciding and presenting a second acute angle of less than 90 degrees relative to the horizontal plane, the second tilt direction is opposite to the first tilt direction when seen in a transverse direction going from the first propeller to the second propeller, the second axis of rotation and the second thrust are parallel to the horizontal plane in the fourth position.

13. The rotorcraft according to claim 11, wherein the main rotor includes main blades rotating about a main axis of rotation of the main rotor, the tilt axis intersecting the main axis of rotation.

14. The rotorcraft according to claim 12, wherein the first propeller presents a first thrust center positioned on the tilt axis and the second propeller presents a second center of thrust positioned on the tilt axis.

15. The rotorcraft according to claim 9, wherein the first propeller comprises a first propeller shaft for rotating a first hub carrying first blades, the second propeller comprises a second propeller shaft for rotating a second hub carrying second blades, and the adjustment system includes a first device for cyclically modifying the pitch of the blades of the first propeller and a second device for cyclically modifying the pitch of the blades of the second propeller.

16. A method of optimizing the lift of the rotorcraft according to claim 1, in which the method includes the following step:
  positioning the first propeller in the first low speed configuration and the second propeller in the second low speed configuration during a stage of hovering flight.

17. The method according to claim 16, wherein the method includes the following step:
  positioning the first propeller in the first high speed configuration and the second propeller in the second speed configuration when the rotorcraft is traveling forwards at a speed greater than or equal to a speed threshold.

18. A rotorcraft comprising a fuselage extending vertically upwards and surmounted by a main lift rotor, the rotorcraft having a rectangular reference frame presenting a first unit vector extending in a forward direction from a center of gravity of the rotorcraft towards the front, the rectangular reference frame presenting a second unit vector extending from the center of gravity in a direction going from the first flank to the second flank, and the rectangular reference frame presenting a third unit vector extending in an elevation direction from the center of gravity towards the main lift rotor, the rotorcraft comprising a first propeller and a second propeller carried respectively by two arms and capable of exerting respectively first thrust and second thrust, the first propeller and the second propeller arranged on opposite sides of the fuselage, the first propeller and the second propeller respectively having first blades and second blades rotatable respectively about a first axis of rotation and a second axis of rotation, the first blades presenting pitch capable of varying over a first pitch range generating the first thrust directed towards the front of the rotorcraft and over a second pitch range generating the first thrust directed towards the rear of the rotorcraft,
  wherein the rotorcraft includes an adjustment system for acting on the first propeller and the second propeller, the second blades presenting pitch capable of varying over a third pitch range generating the second thrust directed towards the front of the rotorcraft, the adjustment system configured, at least during a stage of hovering flight, to position the first propeller in a first low speed configuration, the first thrust when the first propeller is in the first low speed configuration having a first horizontal component directed parallel to the first vector and in a direction opposite to the first vector, and a first vertical component directed parallel to the third vector in the elevation direction, the adjustment system configured, at least during the stage of hovering flight, to position the second propeller in a second low speed configuration, the second thrust when the second propeller is in the second low speed configuration comprising a second horizontal component directed parallel to the first vector and in the same direction as the first vector, and a second vertical component directed parallel to the third vector in the same direction as the third vector.

19. The rotorcraft according to claim 1, wherein the adjustment system is configured to position the first propeller in the first low speed configuration and the second propeller in the second low speed configuration when the rotorcraft is traveling forwards at a speed less than a speed threshold, and wherein when the first propeller is in the first low speed configuration the first thrust presents an acute angle of less than 90 degrees relative to a horizontal plane containing the first vector and the second vector, the second thrust presenting an acute angle of less than 90 degrees with that horizontal plane.

20. The rotorcraft according to claim 18, wherein the first propeller comprises a first propeller shaft for rotating a first hub carrying first blades, the second propeller comprises a second propeller shaft for rotating a second hub carrying second blades, and the adjustment system includes a first device for cyclically modifying the pitch of the blades of the first propeller and a second device for cyclically modifying the pitch of the blades of the second propeller.

* * * * *